(12) United States Patent
Sato

(10) Patent No.: US 9,076,098 B2
(45) Date of Patent: Jul. 7, 2015

(54) PRINTING APPARATUS AND CONTROL METHOD THEREFOR

(71) Applicant: CANON KABUSHIKI KAISHA, Tokyo (JP)

(72) Inventor: Kazuya Sato, Sagamihara (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 175 days.

(21) Appl. No.: 13/649,554

(22) Filed: Oct. 11, 2012

(65) Prior Publication Data

US 2013/0114106 A1 May 9, 2013

(30) Foreign Application Priority Data

Nov. 7, 2011 (JP) .................................. 2011-243976
Aug. 13, 2012 (JP) .................................. 2012-179628

(51) Int. Cl.
*G06F 3/12* (2006.01)
*G06K 1/00* (2006.01)
*G06K 15/02* (2006.01)

(52) U.S. Cl.
CPC ........ *G06K 15/1822* (2013.01); *G06K 15/1861* (2013.01); *G06K 15/1863* (2013.01)

(58) Field of Classification Search
USPC ....................................................... 358/1.15
See application file for complete search history.

(56) References Cited

U.S. PATENT DOCUMENTS

| 5,774,638 | A | 6/1998 | Kageyama et al. |
| 6,025,923 | A | 2/2000 | Kageyama et al. |
| 7,046,385 | B2 | 5/2006 | Mori et al. |
| 7,184,165 | B2 | 2/2007 | Mori et al. |
| 2009/0128841 | A1* | 5/2009 | Cyman et al. ............... 358/1.13 |
| 2010/0134844 | A1* | 6/2010 | Ito .............................. 358/1.17 |
| 2011/0075165 | A1* | 3/2011 | Hayakawa .................. 358/1.9 |
| 2011/0235101 | A1* | 9/2011 | Misawa ....................... 358/1.15 |

FOREIGN PATENT DOCUMENTS

| JP | 9-218758 A | 8/1997 |
| JP | 11-24860 A | 1/1999 |
| JP | 2000-33744 A | 2/2000 |
| JP | 2002-200814 A | 7/2002 |

* cited by examiner

*Primary Examiner* — Huo Long Chen
(74) *Attorney, Agent, or Firm* — Fitzpatrick, Cella, Harper & Scinto

(57) ABSTRACT

A rendering process is not distributed in units that take into consideration an object construction. The rendering process divides printing data into page units, generates a plurality of divided printing data, merges divided printing data related to the same double spread page from the plurality of divided printing data, and converts each of the merged divided printing data into bitmap data by a plurality of rendering units.

7 Claims, 13 Drawing Sheets

FIG. 1B

PRINTING JOB INFORMATION

JOB ID : XXXXXXXXX

PAGE : 40/100

30%

OUTPUT SORTER : No2

JOB LIST

| | ID | STATUS | PRINT | OUTPUT SORTER | INPUT TIME | PRIORITY |
|---|---|---|---|---|---|---|
| 1 | XXXXXX | FINISHED | FINISHED | 01 | 2009/06/11 | MEDIUM |
| 2 | XXXXXX | PRINTING | UNPROCESSED | 02 | 2009/06/11 | HIGH |
| | | | | | | |
| | | | | | | |
| | | | | | | |
| | | | | | | |

115

FIG. 7
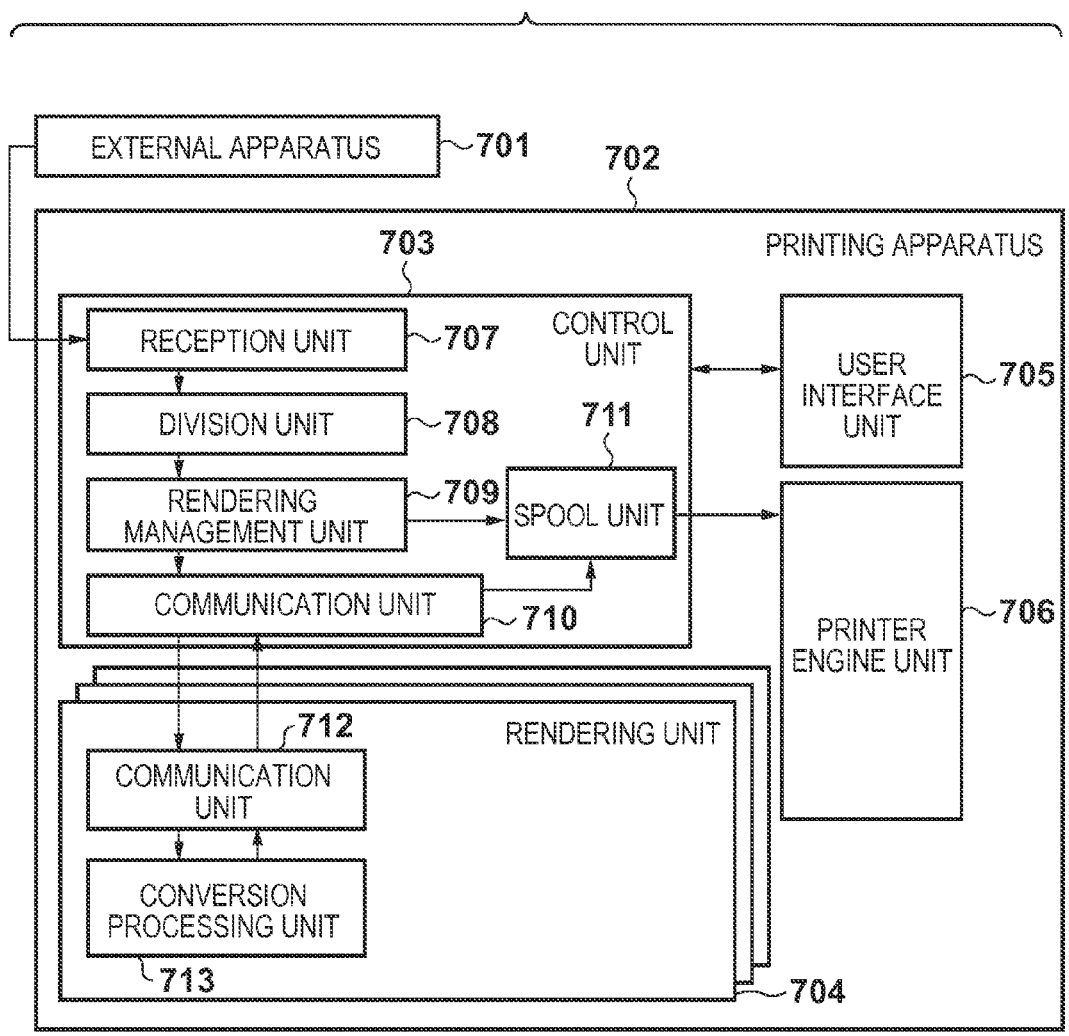
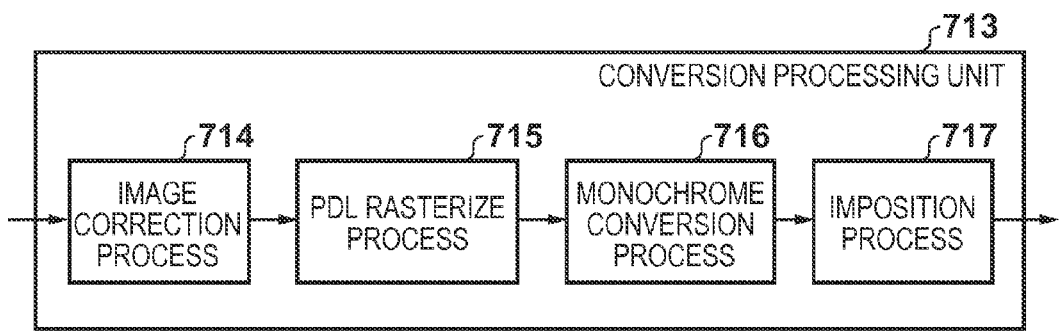

PRINTING APPARATUS AND CONTROL METHOD THEREFOR

BACKGROUND OF THE INVENTION

1. Field of the Invention

The present invention relates to a printing apparatus that prints printing data including images, and a control method for the printing apparatus.

2. Description of the Related Art

Japanese Patent Laid-Open No. 9-218758 discusses a first storage unit that stores page description language (PDL) specification data, and a development process generating unit that generates a plurality of development processes for developing PDL specification data stored in the first storage unit into image data. Japanese Patent Laid-Open No. 9-218758 further discusses a second storage unit that stores the image data developed by the generated development processes, and a transfer unit that transfers the image data stored in the second storage unit to corresponding image forming units. The Japanese Patent Laid-Open No. 9-218758 further discusses a configuration of executing in parallel the development processes generated by the development process generating unit.

In Japanese Patent Laid-Open No. 11-24860, a plurality of inputted print jobs are divided in page units, and execution units for compressed data generation processing and for output processing are assigned, in units of divided pages, from multiple data compression generating units and multiple output units. This assigning is conducted on the basis of data accumulation information of spool units and information relating to data processing conditions of the compressed data generating units and the output units. The compressed data generating units and the output units for executing the processing of the pages are determined according to this assigning, and a configuration is described in which data compression, development, and output processes are executed by the determined compressed data generating units and output units so that a printing process is executed on the basis of a uniform load distribution.

Japanese Patent Laid-Open No. 2002-200814 discusses the following configuration. Placement data is inputted for deciding the placement of pages when combining and printing a plurality of pages of printing data on one printing page, and a portion of page data to be printed as a single page is extracted from the printing data according to the inputted placement data and saved. A printing control device that outputs the printing data generated from the saved page data includes a specification unit. The specification unit specifies, with respect to the placement data, the placement of additional printing data pages in combination with the placement data on one page when the printed result on a printing page is bound. The printing control device further includes a generating unit that generates printing data in which data of a plurality of page data is placed according to the placement data on the one page when bound.

Japanese Patent Laid-Open No. 2000-33744 discusses a printing control method that stores printing commands over multiple pages in a command buffer and carries out a rendering procedure and a printing procedure of the pages with multiple processors according to the printing commands. In this method, when image procedures of different pages are successively assigned to different processors, a string of printing commands over the multiple pages in the command buffer are read, and blank rendering is executed to carry out the setting of rendering attribute parameters of each page without carrying out actual rendering. In this method, the actual rendering by the processors is then rendered on the basis of the printing command string according to the set rendering attribute parameters on each page in which the blank rendering is finished.

SUMMARY OF THE INVENTION

In the prior art described above, printing quality is poor since object construction in the PDL is not considered when parallel processing is conducted on each page by a plurality of rendering units.

The present invention provides a printing apparatus and a control method therefor that are easily implemented with high speed by considering object construction and by connecting a plurality of rendering units to a controller.

According to one aspect of the present invention, there is provided a printing apparatus that prints printing data including an image, the apparatus comprising: a reception unit configured to receive the printing data; a division unit configured to divide the printing data received by the reception unit into page units and generate a plurality of divided printing data; a plurality of rendering units configured to receive printing unit data and conduct an image correction process and a bitmap data conversion process; a rendering management unit configured to analyze the printing data and, on the basis of the analysis result, generate, from the plurality of divided printing data, the printing unit data constituted by the divided printing data to be merged and processed, determine at least one rendering unit to cause the printing unit data to be processed from the plurality of rendering units in accordance with load conditions of the plurality of rendering units, and transmit the printing unit data to the determined rendering unit; a spool unit configured to receive and spool bitmap data from each of the plurality of rendering units; a printer engine unit configured to print an image based on the bitmap data onto a print medium; and a control unit configured to transmit the bitmap data spooled in the spool unit to the printer engine unit in an order to be printed.

Further features of the present invention will become apparent from the following description of exemplary embodiments (with reference to the attached drawings).

BRIEF DESCRIPTION OF THE DRAWINGS

FIG. 1B shows an example of a user interface of the printing apparatus.

FIG. 7 is a block diagram for describing a control configuration of a printing apparatus.

DESCRIPTION OF THE EMBODIMENTS

Figure 1A:
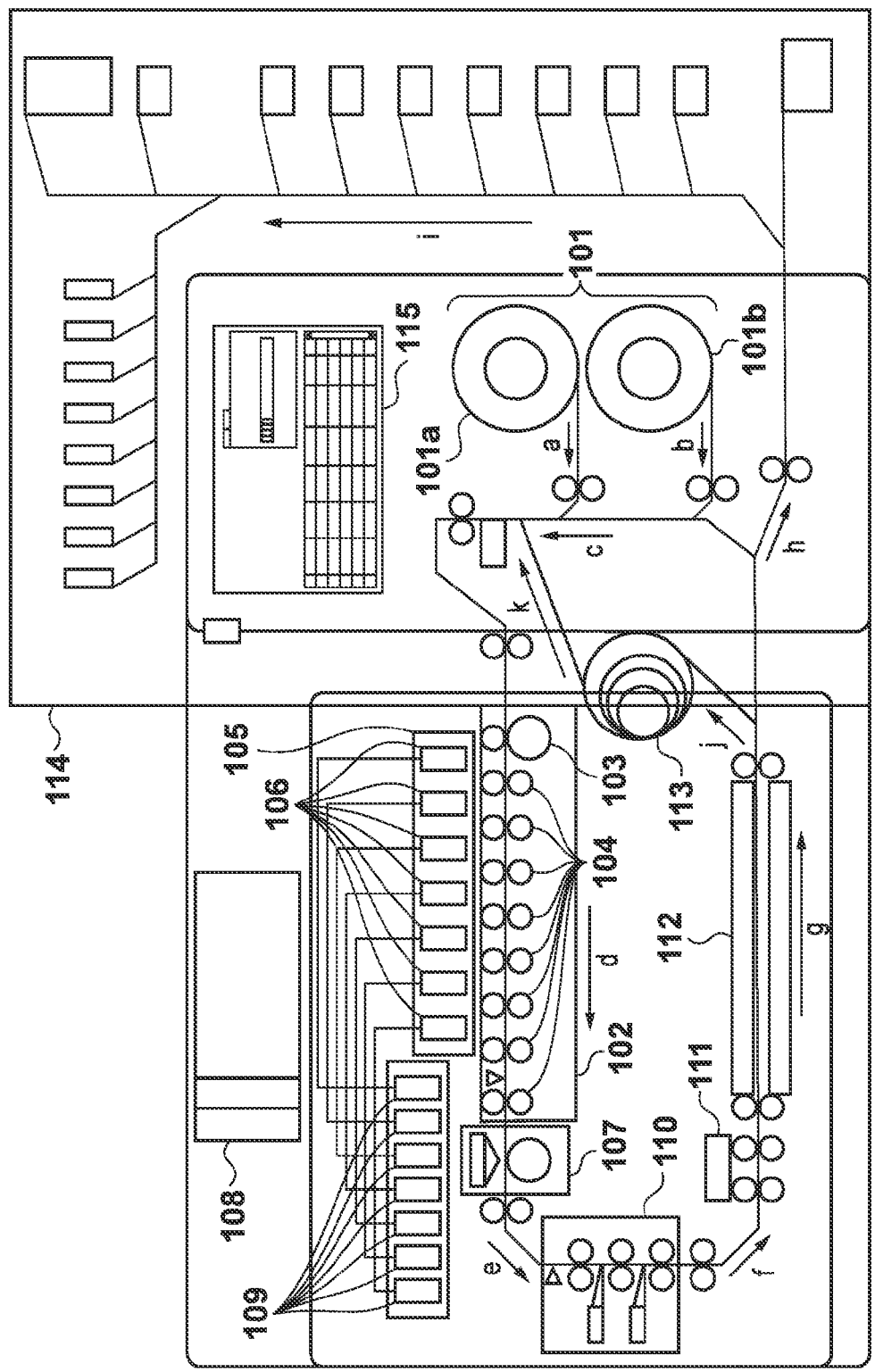
FIG. 1A is a section view showing an overall configuration of a printing apparatus.

The embodiments of the present invention will be explained below in exemplary detail with reference to the attached drawings. The relative configurations and device shapes and the like of the constituent elements described in the embodiments are merely examples and are not intended to limit the scope of the invention.

A "printing apparatus" of the specification is not limited to a dedicated machine used only for a printing function, and may include a multi function peripheral having a printing function and other functions, or a manufacturing device and the like that forms images and patterns on print media (print sheet).

A general configuration of a printing apparatus will be described with reference to FIG. 7. A printing apparatus 702 that prints images processes job data such as a PDL from an external apparatus 701 such as a host PC and the like, and conducts printing on print media such as a roll sheet and the like. A control unit 703 of the printing apparatus 702 analyzes the job data from the external apparatus 701 and creates data and commands for transmitting to a rendering unit 704 on the basis of the analysis results or an instruction from a user interface unit 705. Furthermore, the control unit 703 receives, from the rendering unit 704, bitmap data that has been rendered by the rendering unit 704, and transmits the bitmap data to a printer engine unit 706.

The rendering unit 704 of the printing apparatus 702 is configured as one or a plurality of units and performs rendering based on the data and commands transmitted from the control unit 703, and transmits rendered bitmap data to the control unit 703. The printer engine unit 706 of the printing apparatus 702 implements image processing such as color conversion and the like on the bitmap data transmitted from the control unit 703, and then conducts printing on the print media such as a roll sheet.

The job data from the external apparatus 701 is first stored in a reception unit 707 in the control unit 703. Next, job data is divided into units that instruct the rendering unit 704 by a division unit 708. A rendering management unit 709 analyzes the type of layout of the job data and the type of construction of an object (whether the object straddles pages) according to the contents of the job data and instructions from the user interface unit 705. The rendering management unit 709 then considers the operating conditions of the rendering unit 704 and decides to which rendering unit 704 to transmit on the basis of the analysis result. When an object straddles more than one page due to a double spread layout and the like, the rendering management unit 709 assigns the rendering of the pages related to the object straddling more than one page to the same rendering unit 704.

A communication unit 710 creates and transmits divided job data and commands for instructing the rendering unit 704 about an image processing mode on the basis of an instruction from the rendering management unit 709. A mode herein indicates, for example, the presence of an image correction process, a printing surface instruction such as single-side or double-side, or a downstream instruction such as stitch binding or saddle stitch and the like.

The divided job data and the commands transmitted from the control unit 703 are received by a communication unit 712 in the rendering unit 704, and rendering (bitmap data conversion process) is conducted by a conversion processing unit 713. The conversion processing unit 713 executes image processing such as an image correction process 714, a PDL rasterize process 715, a monochrome conversion process 716, and an imposition process 717.

The image correction process 714 conducts an image correction process specified by a command on the image data in the divided job data. The PDL rasterize process 715 interprets the PDL to conduct a logical rendering and the like, and to create bitmap data.

The monochrome conversion process 716 conducts color conversion preceding a color conversion process conducted by a color conversion unit in the printer engine unit 706. The color conversion in the monochrome conversion process is a prior stage process conducted so that, for example, minute reproduction differences such as warm black tone, cold black tone, and pure black tone will be brought out by the color conversion unit in the printer engine unit 706. For example, the warm black tone is a tone that reproduces gray including a small amount of red to obtain a warm impression in the monochrome conversion process. The cold black tone is a tone that reproduces gray including a small amount of blue to obtain a cold impression. The pure black tone is a tone that reproduces a neutral black color. Conversion using a pre-monochrome table in accordance with the monochrome modes is conducted in the monochrome conversion process, and the color conversion unit in the printer engine unit 706 is previously set to conduct a gray reproduction in accordance with the conversion results of the pre-monochrome table.

Figure 3:
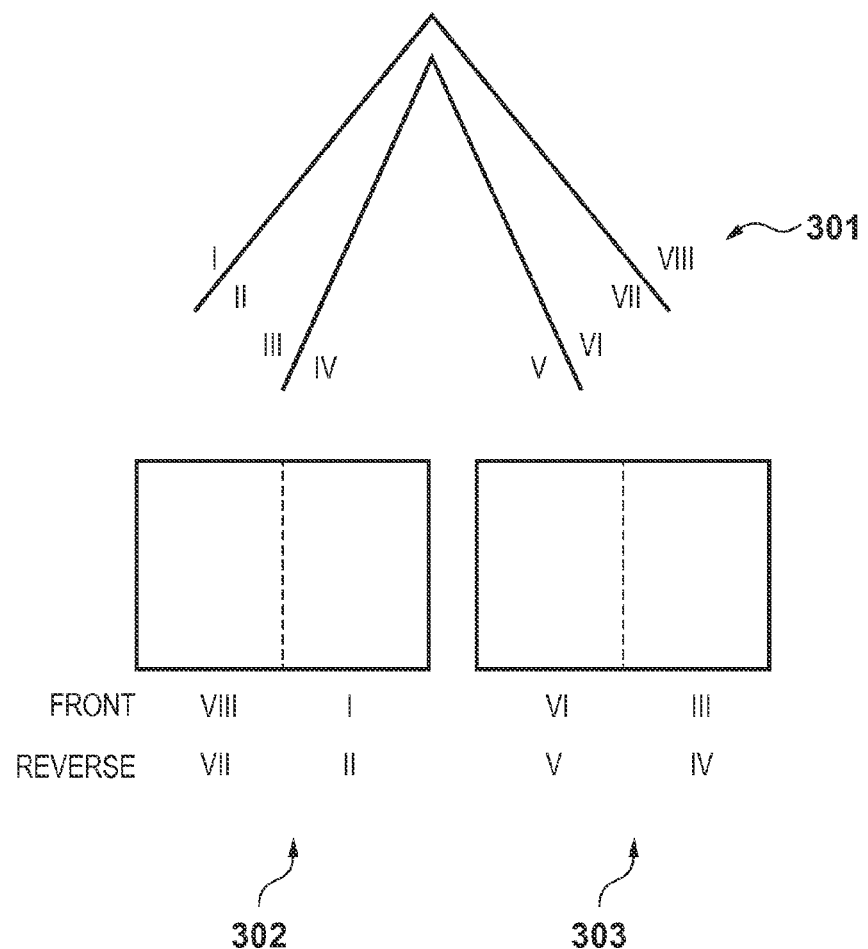
FIG. 3 describes an order of processed pages.

The imposition process 717 imposes, for example, two pages on a one-page portion of the print media in the case of a saddle stitch in accordance with layout setting information for stitching methods such as stitch binding or saddle stitching, or single-side or double-side printing as specified in a command from the control unit 703. This aspect is described with reference to FIG. 3. FIG. 3 shows an example of imposition when double-side saddle stitching is conducted. Reference number 301 is a view of a book seen from above after saddle stitching, and the numbers in parentheses I to VIII indicate the order of the pages. Namely, to obtain a result as shown by reference number 301, printing needs to be conducted as shown by reference numbers 302 and 303. For example, in the pages indicated by reference number 302, page I and page VIII are imposed on the front face, and the reverse face is respectively imposed with page VII and page II. The rendering management unit 709 in the control unit 703 considers the imposition that takes into account the layout of the pages. The bitmap data completed in the imposition process is transmitted from the communication unit 712 to the communication unit 710 in the control unit 703.

The bitmap data received by the communication unit 710 is spooled in a spool unit 711. The control unit 703 transmits the bitmap data in the spool unit 711 and header information of the bitmap data to the printer engine unit 706 in the order to be printed. The printer engine unit 706 conducts the color conversion process on the received bitmap data on the basis of the contents of the header information of the bitmap data. The header information contains information such as whether the bitmap data is the monochrome mode or the color mode and the like.

The color conversion process uses, for example, a color conversion table 1 for color in the color mode, or uses a color conversion table 2 for monochrome in the monochrome mode. Color conversion herein refers to conducting color conversion such as color management and the like in the color mode, and conducting the monochrome conversion process such as warm black tone, cold black tone, and pure black tone, in accordance with the results processed by a monochrome conversion process unit in the rendering unit 704 in the monochrome mode. After such processing, for example, color conversion is conducted on color spaces such as CMYK and the like handled by the printer engine unit 706, and further, a binarize process is conducted as needed. The bitmap data following the color conversion process is printed on the print media.

During printing, processes in the rendering unit 704 divide the job data constituted by multiple pages among the rendering units 704 for each page since the processing is desirably conducted at high speed to allow for high speed printing.

Figure 4:
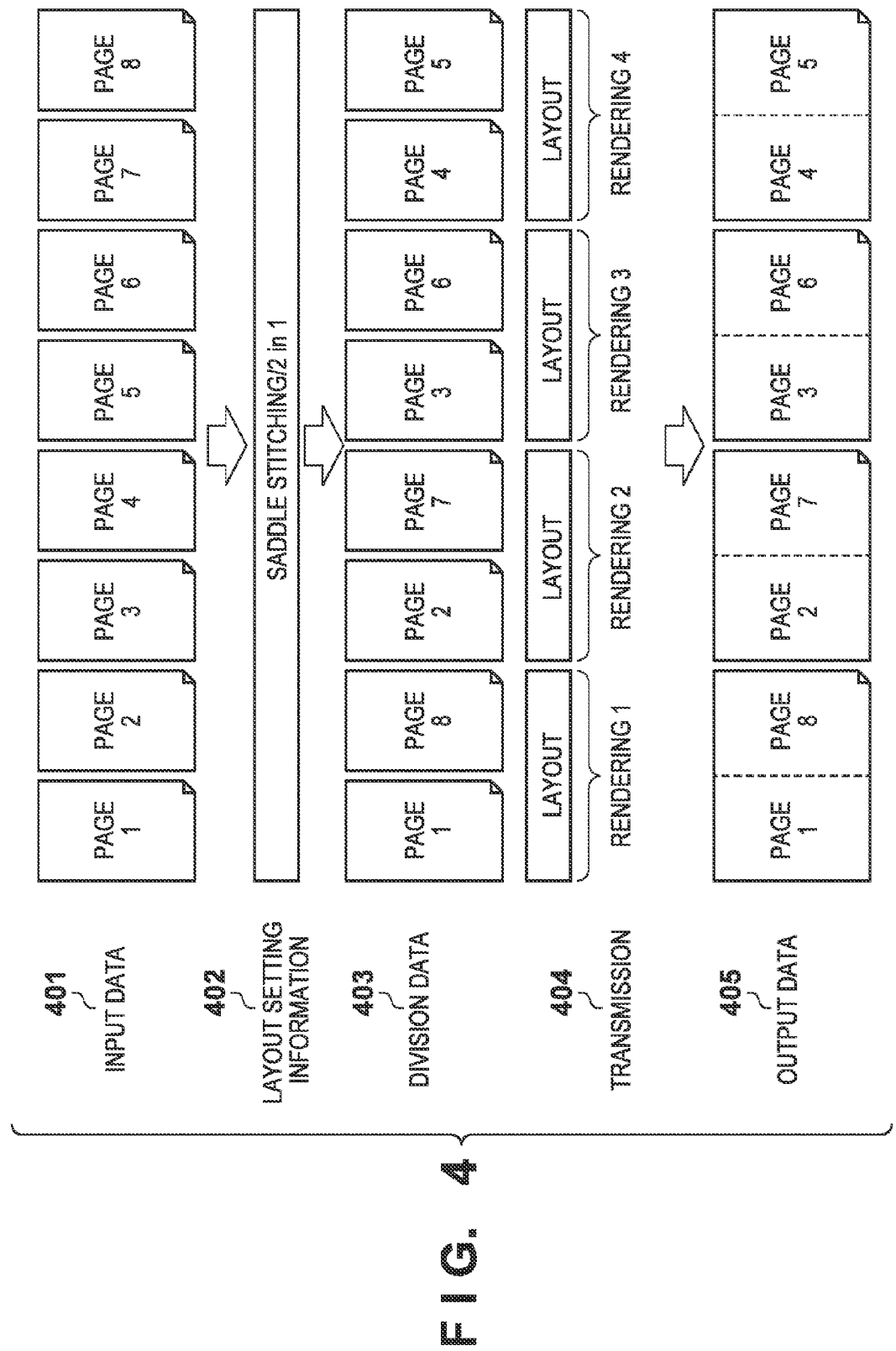
FIG. 4 shows examples of rendering in consideration of imposition.

Even when processing is conducted by separate rendering units for each page, ultimately the advantage of divided processing without generating output data is lost if multiple rendering results are not gathered when imposition and the like are desirably considered. As illustrated in FIG. 3, page arrangement can be considered before imposition is conducted for printing settings such as double-side printing and saddle stitching and the like. For the front page VIII and page I to be printed once by a printer engine unit, the front page VIII and page I need to be generated in the same bitmap data by a printing apparatus. If not all of the bitmap data is generated, transmission to the printer engine unit cannot be conducted if the page I and the page VIII are processed by separate rendering units for high speed printing. Therefore, as shown in FIG. 4, efficient processing is possible with a configuration in which layout setting information 402 with respect to divided input data 401 is taken into account, and divided data 403 necessary for rendering is merged and transmitted 404 to the rendering unit and rendered to obtain output data 405.

Figure 5:
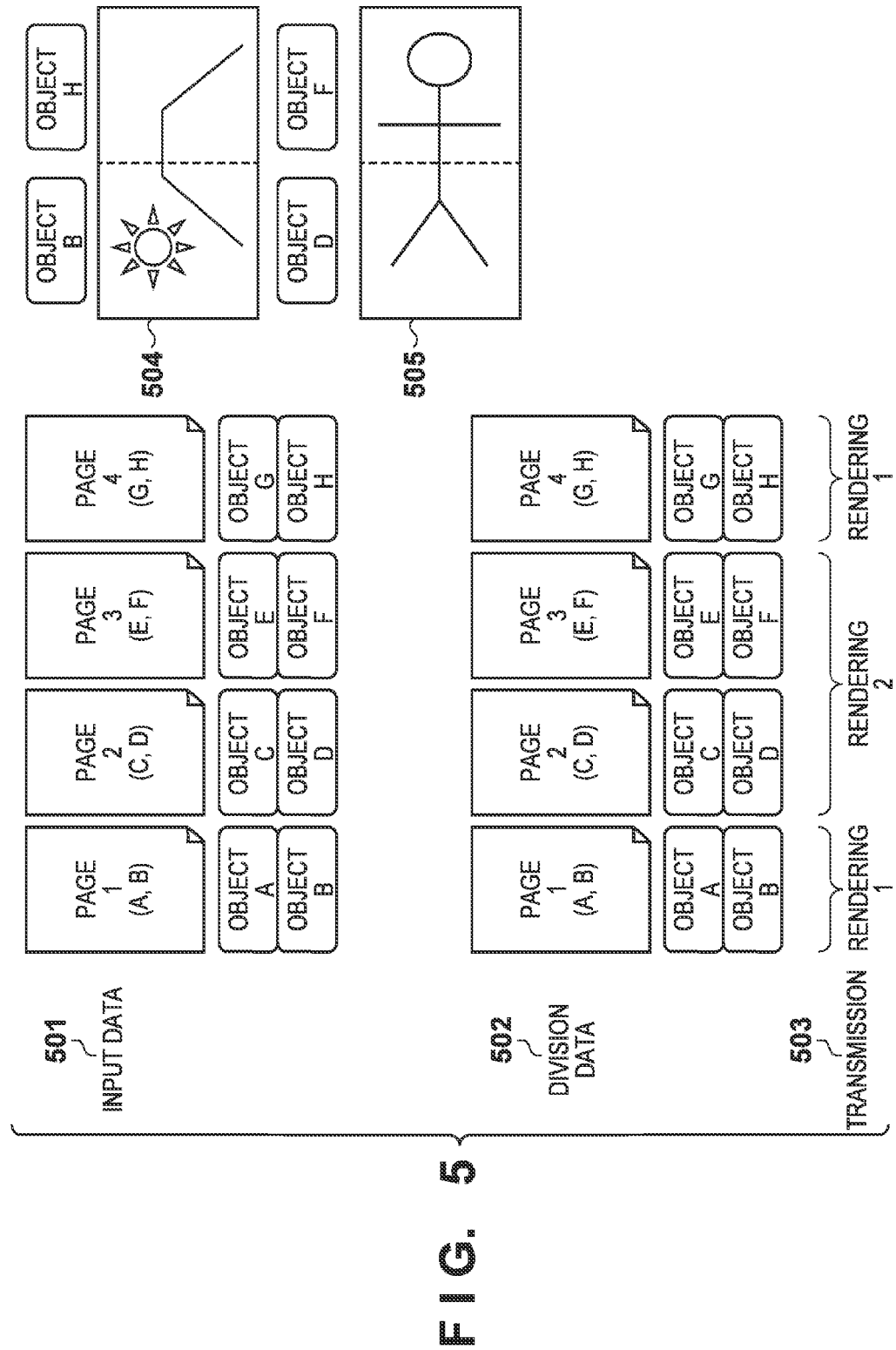
FIG. 5 shows examples of rendering in consideration of an object in a used PDL straddling more than one page.

When job data is distributed to multiple rendering functions to further increase the printing speed, image correction processing is conducted by each of the rendering units when analyzing images and implementing an image correction process with respect to images arranged so as to straddle more than one page. As a result, there is a risk that images may be ultimately generated in a discontinuous manner. For example, input data 501 in FIG. 5 includes an object B and an object H that are reproduced continuously on page 1 and page 4 as shown by reference number 504, and an object D and object F reproduced continuously on page 2 and page 3 as shown by reference number 505. In processing this type of PDL job data, when the pages are divided as shown by reference number 502 and rendering is conducted on each page separately, the results are discontinuous when image correction processing is implemented according to the images (objects) during rendering. When image correction processing is conducted on an image straddling more than one page in this way, an image correction process needs to be conducted in which a page group that includes continuous objects as shown by reference number 503 is transmitted to the same rendering unit and the continuous objects are combined.

A process to correct the contrast or the brightness of an object on the basis of a background (scenery, etc.) and an object (a person, etc.) for images subject to processing may be seen as an example of image processing in which the objects are discontinuous. When one photograph is divided into left and right halves and correction processing is conducted respectively on the two images divided into left and right images, the degree of applied correction processing is changed if the backgrounds are different on the right and left and the area ratios of the backgrounds and the objects are different.

FIG. 1A is a detailed section view of a printer engine unit 206 in a printing apparatus 702 using a roll sheet (a continuous sheet that is longer than a printing unit in the conveying direction) as print media. The apparatus includes a roll sheet unit 101, a conveyor unit 102, a conveyor encoder 103, rotating rollers 104, a head unit 105, printing heads 106, a scanner unit 107, a control unit 108, and an ink tank 109. The apparatus also includes a cutter unit 110, a second surface printing unit 111, a drying unit 112, a sheet take-up unit 113, a sorting unit 114, and an operation unit 115. The various constituent elements are provided inside a housing of the apparatus. The control unit 108 governs the various controls of the entire device and houses a control part (including a CPU, a RAM, a ROM, a storage device, and the like) that includes a controller, a user interface, and various types of I/O interfaces.

The roll sheet unit 101 includes two sheets cassettes, that is, an upper sheet cassette 101a and a lower sheet cassette 101b. A user mounts the roll sheet (hereinbelow, referred to as a "sheet") onto a magazine by inserting the roll sheet into the image forming apparatus body from the front. A sheet drawn from the upper sheet cassette 101a is conveyed in the direction "a" in FIG. 1A, and a sheet is drawn from the lower sheet cassette 101b and conveyed in the direction "b" in FIG. 1A. The sheets from either of the cassettes advance in the direction "c" in FIG. 1A to the conveyor unit 102. The conveyor unit 102 conveys the sheet undergoing printing in the direction "d" (horizontal direction) in FIG. 1A past the plurality of rotating rollers 104.

The head unit 105 is arranged above and facing the conveyor unit 102. Separate printing heads 106 divided into colors (seven colors in the present embodiment) are retained by the head unit 105 along the sheet conveying direction. Ink is discharged from the printing heads 106 to form images on the sheet in synchronization with the conveyance of the sheet by the conveyor unit 102. The conveyor unit 102, the head unit 105, and the printing heads 106 constitute a printing unit.

The ink tank 109 separately accommodates ink of various colors. Ink is supplied from the ink tank 109 via tubes to sub-tanks provided for each color, and the ink is supplied from the sub-tanks via tubes to the printing heads 106. Line heads in each color (seven colors in the embodiment) of the printing heads 106 are arranged in a row along the direction "d" of the conveyance direction during printing. The line heads of the colors may be formed as a seamless single nozzle tip or as divided nozzle tips arranged in a regular manner such as in one row or in a staggered arrangement. In the present embodiment, the nozzles are provided in a range that covers the maximum printing width of the sheet being used, that is, a so-called full multi-head.

An ink-jet system that discharges ink from nozzles may use a system that uses heated elements, a system that uses piezo-electric elements, a system that uses static electric elements, or a system that uses MEMS elements and the like. Ink is discharged from the nozzles of the printing heads 106 according to printing data, and the timing of the discharge is determined according to output signals from the conveyor encoder 103. The present invention is not limited to a printer using an ink-jet system, and various printing systems such as a thermal printer (sublimation type, heat transcription type, etc.), a dot impact printer, and LED printer, a laser printer and the like may be applicable to the present invention.

After forming the images on the sheet, the sheet is conveyed from the conveyor unit 102 to the scanner unit 107. The scanner unit 107 reads the printed images and special patterns to confirm that there is no problem with the printed images and to confirm the status of the apparatus. The present embodiment allows for the selection of an image confirmation method such as a method of reading a pattern to confirm the status of the printing heads 106, or a method of comparing a printed image with an original image.

The sheet conveyed from the scanner unit 107 is conveyed in the direction "e" and is guided to the cutter unit 110. The cutter unit 110 cuts the sheet into lengths of certain printing units. The length of the certain printing units differs according to the size of the image to be printed. For example, the printing unit length in the conveyance direction is 135 mm for an L-size photograph, whereas the printing unit length in the conveyance direction is 297 mm for an A-4 size sheet.

The sheet conveyed from the cutter unit 110 is conveyed in the direction "f" and is conveyed to the second surface printing unit 111. The second surface printing unit 111 is a unit for allowing the printing of information (e.g., order management numbers, etc.) for each printed image.

The drying unit 112 that receives the sheet conveyed from the second surface printing unit 111 is a unit that heats with warm air the sheet passing through the drying unit 112 in the direction "g" in FIG. 1A, in order to quickly dry the sheet with ink applied thereon. The sheets cut into printing unit lengths are passed through the drying unit 112 one sheet at a time and are conveyed in the direction "h" in FIG. 1A to the sorting unit 114.

The sorting unit 114 confirms the sheets passing through the sorting unit 114 in the direction "i" in FIG. 1A with sensors and loads the sheets onto trays that correspond to tray numbers set for each printing image. The sorting unit 114 includes a plurality of trays (22 trays in the embodiment) and classifies the trays for loading in accordance with the printing unit lengths. Also various statuses (e.g., a display using an LED mounted on the apparatus housing) such as "now loading" and "loading completed" are displayed.

During double-side printing, image printing on the first surface is conducted first, and the sheets that have not been cut by the cutter unit 110 are conveyed in the direction "j" in FIG. 1A to be taken up by the sheet take-up unit 113. The sheet take-up unit 113 then again conveys the taken up sheets in the direction "k" in FIG. 1A of the unit to allow for the second surface printing after the images have all been formed on the first surface.

The operation unit 115 is a unit for the user to perform various operations and confirmations. The operations and confirmations include confirming onto which trays the specified order images are loaded, or confirming the printing status for each order such as whether printing is underway or completed. Furthermore, the operations and confirmations also include confirming apparatus statuses that indicate the remaining amount of ink or the remaining amount of paper, as well as operations for performing apparatus maintenance such as head cleaning and the like. FIG. 1B shows an example of a user interface for the operation unit 115.

Although FIGS. 1A and 1B show the use of a roll sheet as the print media, it goes without saying that print sheets in standard page units may also be used.

Figure 2:
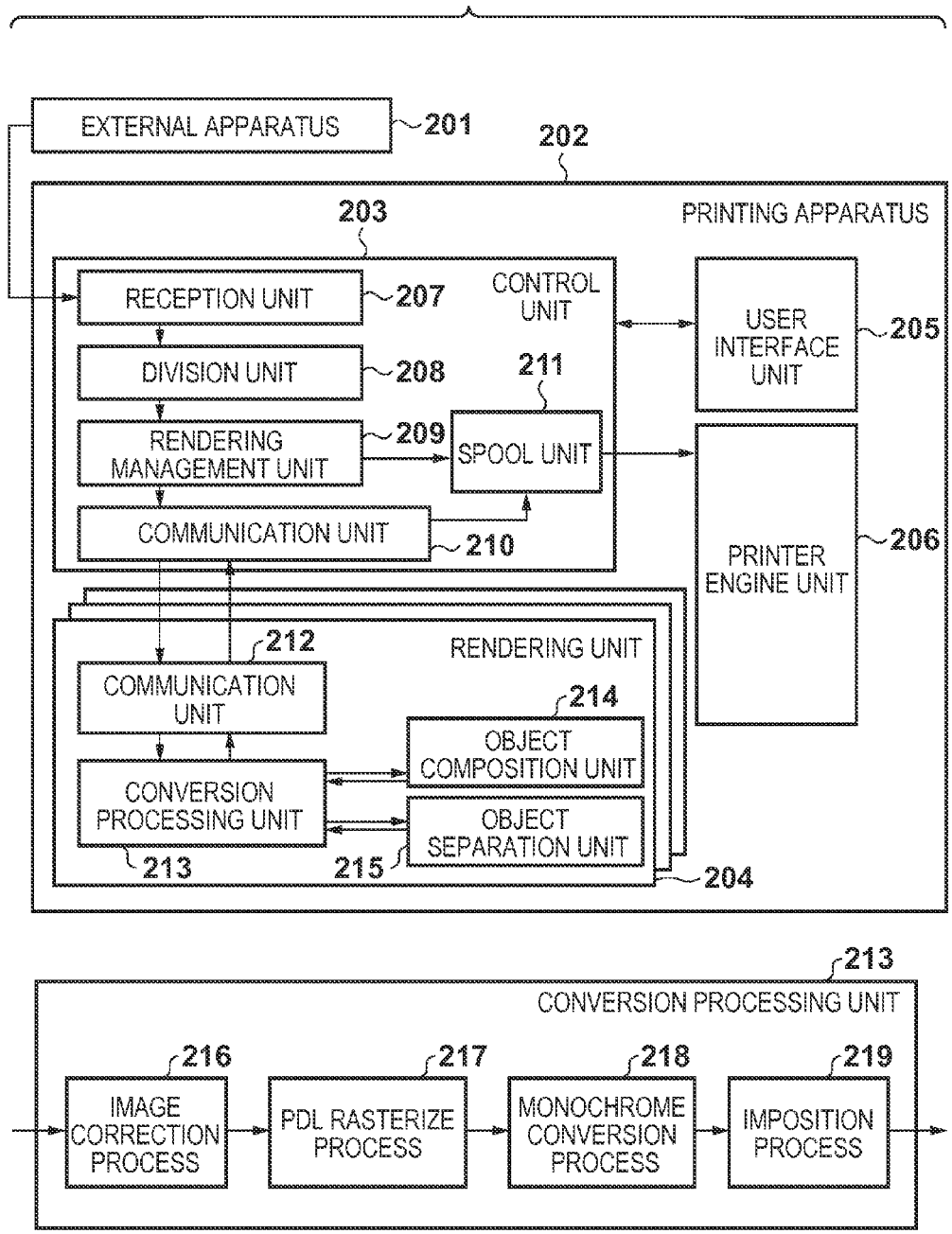
FIG. 2 is a block diagram for describing a control configuration of the printing apparatus.

Next, another example of a printing apparatus will be described using a printing apparatus 202 in FIG. 2. The printing apparatus 202 for printing images processes print data (job data such as PDL) from an external apparatus 201 such as a host PC, to conduct printing on print media such as a roll sheet. A control unit 203 in the printing apparatus 202 analyzes the job data from the external apparatus 201 and generates data and commands for transmitting the job data to a rendering unit 204 on the basis of the analysis results or an instruction from a user interface unit 205. Furthermore, the control unit 203 receives, from the rendering unit 204, bitmap data that has been rendered by the rendering unit 204, and transmits the bitmap data to a printer engine unit 206.

The rendering unit 204 in the printing apparatus 202 is constituted by one or more units, and conducts rendering (bitmap data conversion processing) and an image correction process based on commands and data transmitted from the control unit 203, and transmits the bitmap data after the rendering to the control unit 203. The printer engine unit 206 in the printing apparatus 202 implements image processing such as color conversion and the like on the bitmap data transmitted from the control unit 203, and then conducts printing on the print media such as the roll sheet.

The job data from the external apparatus 201 is first stored in a reception unit 207 in the control unit 203. Then, the job data is divided by a division unit 208 into units (e.g., page units) that instruct the rendering unit 204. A rendering management unit 209 analyzes the type of layout of the job data based on the contents of the job data and an instruction from the user interface unit 205. The rendering management unit 209 considers the operating status of the rendering units 204 to determine to which rendering unit 204 to transmit the job data taking into consideration that an object in the used PDL straddles more than one page.

The communication unit 210 generates and transmits the divided job data serving as divided printing data and the commands for instructing an image processing mode to the rendering units 204 on the basis of the instruction from the rendering management unit 209. A mode, for example, indicates the presence or absence of an image correction process, or indicates a printing surface instruction such as single-side or double-side or a downstream instruction such as stitch binding or saddle stitch and the like. Relation information of a used object that straddles more than one page is added to the divided job data. The control unit 203 also controls the user interface unit 205 for displaying a job status.

The commands and the divided job data transmitted from the control unit 203 are received by a communication unit 212 in the rendering unit 204, and rendering is conducted by a conversion processing unit 213. Processes such as an image correction process 216, a PDL rasterize process 217, a monochrome conversion process 218, and an imposition process 219 are conducted by the conversion processing unit 213.

The image correction process 216 conducts an image correction process specified by a command on the image data in the divided job data. When the fact that an object specified in the PDL is associated with another page by the control unit 203 is specified in the image correction process 216, the image correction process is conducted after the related objects are combined by an object composition unit 214. After the combining and image correction process, an object separation unit 215 separates the objects and returns the objects to their original form before the combination.

The PDL rasterize process 217 interprets the PDL to conduct a logical rendering and the like, and to create bitmap data.

The monochrome conversion process 218 conducts color conversion preceding a color conversion process conducted by a color conversion unit in the printer engine unit 206. The color conversion in the monochrome conversion process is a prior stage process conducted so that, for example, minute reproduction differences such as warm black tone, cold black tone, and pure black tone will be brought out by the color conversion unit in the printer engine unit 206. The explanation of the warm black tone, the cold black tone, and the pure black tone is the same as explained in the prior art.

The imposition process 219 imposes, for example, two pages on a one-page portion of print media in the case of a saddle stitch in accordance with layout setting information for stitching methods such as stitch binding or saddle stitching, or single-side or double-side printing as specified in a command from the control unit 203. The rendering management unit 209 in the control unit 203 considers the imposition that takes into account the layout of the pages. The bitmap data after the completion of the imposition process 219 is transmitted from the communication unit 212 to a communication unit 210 in the control unit 203. At the same time, the job status information related to the bitmap data is transmitted to the control unit 203. The job status information is information that indicates whether the job data was rendered correctly, or whether an error occurred, and is used in the job status display on the user interface unit 205. For example, when an error occurs in the conversion processing unit 213 in the rendering unit 204, the job status information of the error is transferred through the communication unit 212 and the communication unit 210 to the control unit 203. The control unit 203 controls the displaying of the job status information for each job data item on the user interface unit 205.

The bitmap data received by the communication unit 210 is spooled in a spool unit 211. The control unit 203 transmits the bitmap data in the spool unit 211 and header information of the bitmap data to the printer engine unit 206 in the order to be printed. The printer engine unit 206 conducts the color conversion process on the received bitmap data on the basis of the contents of the header information of the bitmap data. The header information contains information such as whether the bitmap data is in the monochrome mode or the color mode and the like.

The color conversion process uses, for example, a color conversion table 1 for color in the color mode, and uses a color conversion table 2 for monochrome in the monochrome mode. Color conversion herein refers to conducting color conversion such as color management and the like in the color mode, and conducting the monochrome conversion process such as warm black tone, cold black tone, and pure black tone, in accordance with the results processed by a monochrome conversion process unit in the rendering unit 204 in the monochrome mode. After such processing, for example, colors are converted to color spaces such as CMYK and the like handled by the printer engine unit 206, and further a binarize process is conducted as necessary. The bitmap data following the color conversion process is printed on the print media.

Next, processing by the control unit 203 will be described using flow charts shown in FIGS. 8, 9 and 10. The control unit 203 processing is separated into a process to transfer data to the rendering unit 204, a process to receive data from the rendering unit 204, and a process to give display instructions to the user interface unit 205.

Figure 6:
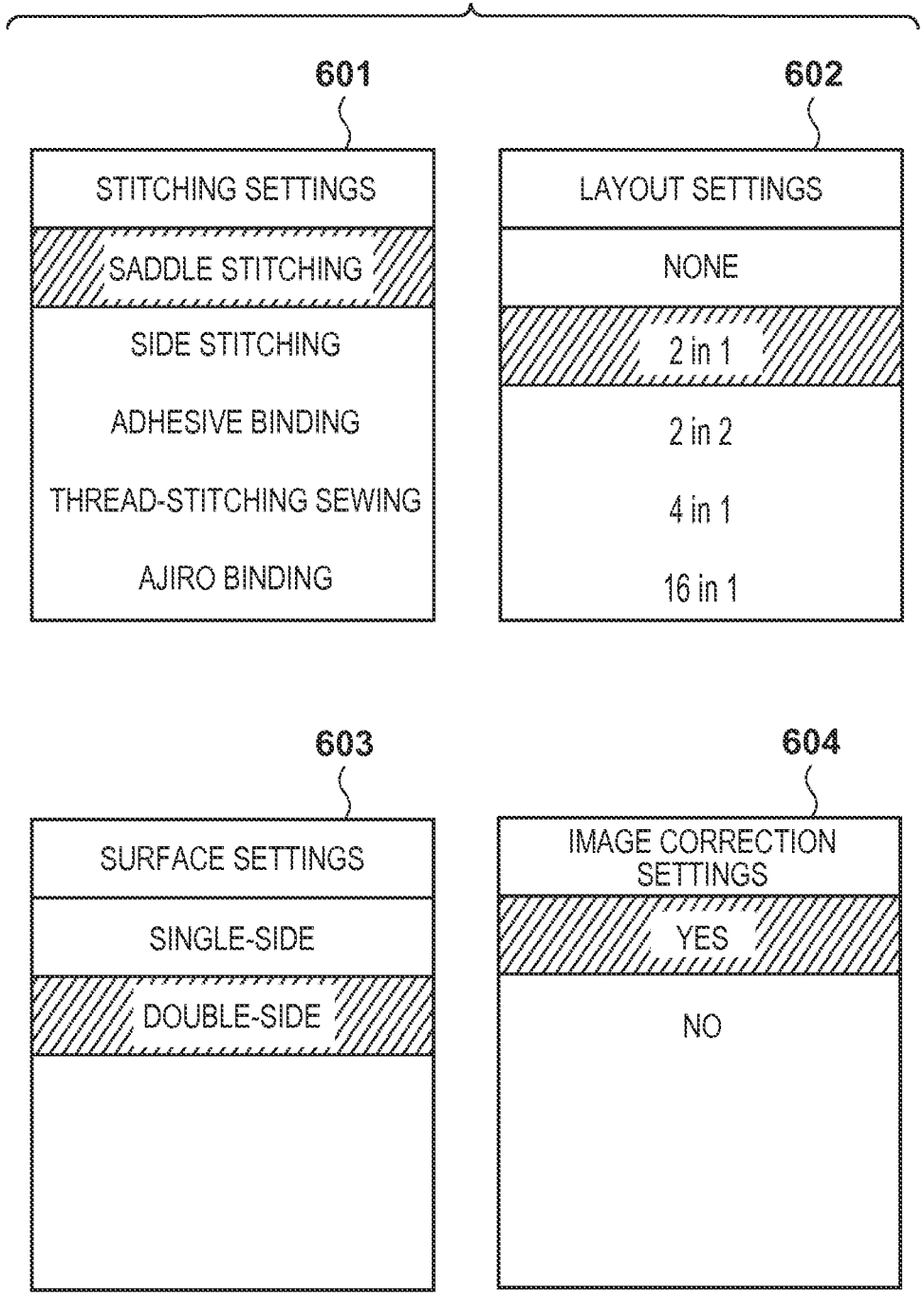
FIG. 6 shows examples of menus in a UI.
Figure 8:
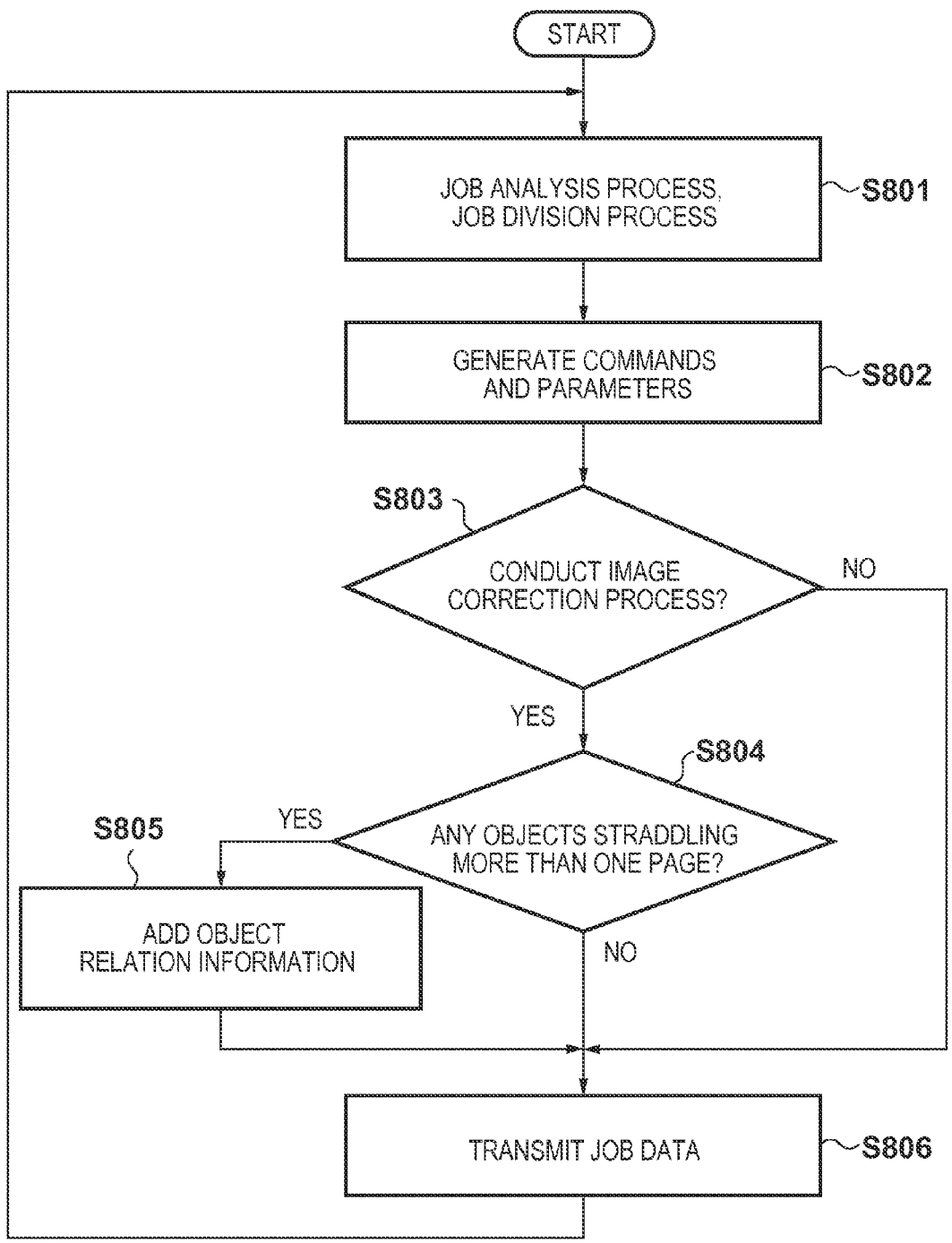
FIG. 8 is a flow chart of a first process by a control unit.

FIG. 8 is a flow chart of a process conducted by the control unit 203 (703). First, in step S801, the division unit 208 in the control unit 203 conducts a job analysis process and conducts a process to divide the jobs into units (printing unit data) that are easy for the rendering unit 204 to process. The job analysis process analyzes whether the job data is a color job or a monochrome job, and also analyzes the types of layout and image correction settings for the job data. The settings for the job data may be transmitted as layout setting information from the external apparatus 201, or may be set by a menu setting in the user interface unit 205 as shown in FIG. 6. FIG. 6 shows examples of stitch settings 601, layout settings 602, surface settings 603, and image correction settings 604.

In step S802, the rendering management unit 209 in the control unit 203 generates commands. Specifically, the rendering management unit 209 generates commands and parameters for indicating image processing modes to the rendering unit 204 on the basis of the job analysis processing analysis results.

In step S803, the control unit 203 determines whether there is any data that indicates that the image correction process by the rendering unit 204 is necessary. If there is no data indicating that the image correction process is necessary (NO in step S803), the routine advances to step S806. Conversely, if there is data that indicates that the image correction process is necessary (YES in step S803), the control unit 203 determines in step S804 whether an object in the used PDL and that straddles more than one page exists. If no such object exists (NO in step S804), the routine advances to step S806. Conversely, if such an object exists (YES in step S804), the control unit 203 adds, in step S805, object relation information (information concerning the object in the used PDL that straddles more than one page) concerning the object to the created parameters. The control unit 203 then determines to which rendering unit 204 to transmit the job data (divided job data) in accordance with the commands and object relation information and the load conditions of the rendering units 204.

In step S805, although the object to be used straddling more than one page can be transmitted to the same rendering unit 204, a determination may be made that transmitting the object to a plurality (two or more) of rendering units 204 is more effective. In this case, the control unit 203 creates a copy of the object and considers the object copy to be divided job data. The data size of the object, load conditions of the rendering unit 204, or a communication bandwidth and the like may be considered as criteria for creating the copy. The divided job data includes the PDL, the object relation information, and unused related objects in the divided job data when a copy is generated. The routine advances to step S806 when the divided job data and the commands are prepared. In step S806, the control unit 203 transmits the job data, the corresponding commands (layout setting information), and the parameters (object relation information) in the communication unit 210 to the rendering unit 204. The routine returns to step S801 after step S806 and the control unit 203 analyzes the next job data.

Figure 9:
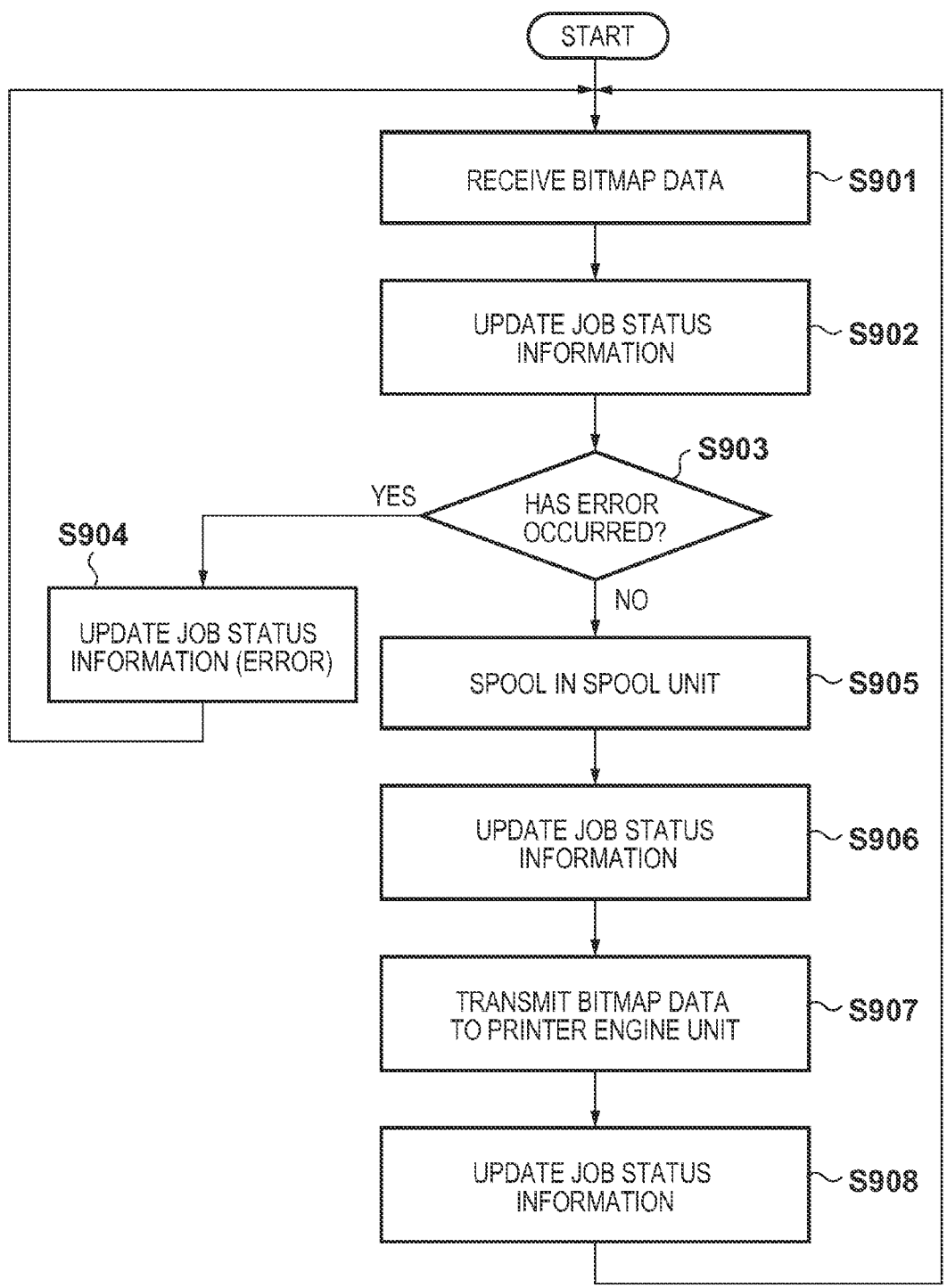
FIG. 9 is a flow chart of a second process by the control unit.

FIG. 9 shows the process of the control unit 203 (703) receiving data from the rendering unit 204. First in step S901, the communication unit 210 in the control unit 203 receives the corresponding job status information and the bitmap data from the rendering unit 204. In step S902, the control unit 203 updates the job status information to display the fact that the rendering is completed. In step S903, the control unit 203 determines whether an error has occurred in the rendering results. This determination is conducted on the basis of the job status information received in step S901. For example, if an error has occurred in the job data in the rendering unit 204, the fact of the error is described in the job status information and thus the error is determined (YES in step S903). The routine then advances to step S904. Conversely, the routine advances to step S905 if it is determined that no error has occurred (NO in step S903).

In step S904, the control unit 203 updates the job status information corresponding to the job ID that specifies the job to error job status information. Conversely, the routine advances to step S905 if it is determined that no error has occurred (NO in step S903).

In step S905, the control unit 203 spools the received bitmap data in the spool unit 211. In step S906, the control unit 203 updates the job status information to an output waiting status. In step S907, the control unit 203 transmits the bitmap data in the spool unit 211 and header information of the bitmap data to the printer engine unit 206 in the order to be printed. In step S908 after the transmission, the control unit 203 updates the job status information to an outputting status. Next, the routine returns to step S901 to receive the next bitmap data.

The transmission to the printer engine unit 206 may be conducted at the point in time that the bitmap data in the order to be printed is spooled in the spool unit 211 in consideration of the processing capacity of the printer engine unit 206. For example, a portion of the bitmap data in the order to be printed of the bitmap data for each page that constitutes one job data item may be transmitted at the point in time the bitmap data is spooled in the spool unit 211. Alternatively, the bitmap data for each page that constitutes one job data item may be transmitted at the point in time that all the bitmap data is gathered, and furthermore, the bitmap data may be transmitted at the point in time when a certain amount of the bitmap data is accumulated in the spool unit 211.

Figure 10:
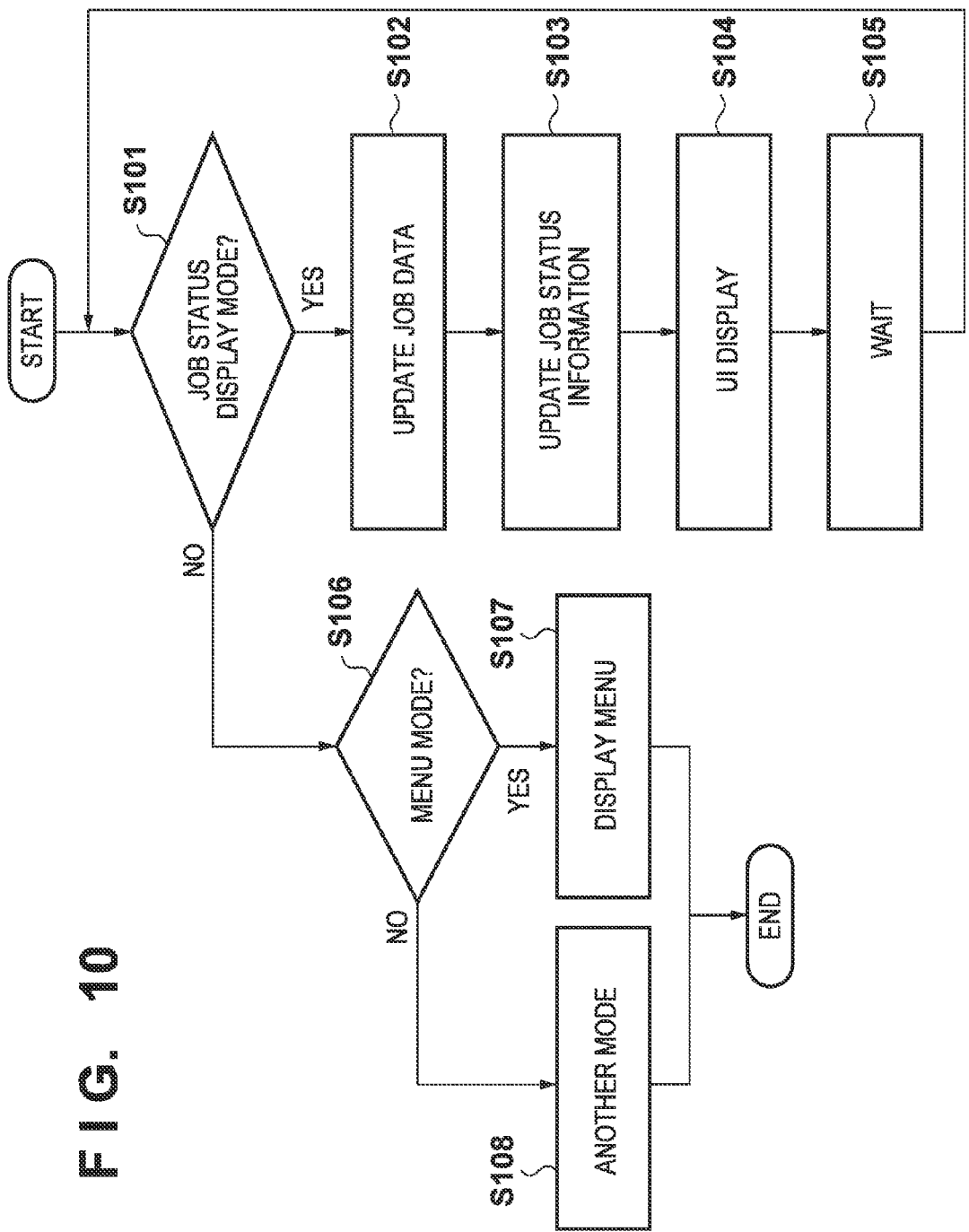
FIG. 10 is a flow chart of a third process by the control unit.

FIG. 10 shows a process to display on the user interface unit 205 (705). In step S101, the user interface unit 205 first determines whether the current mode is the job status display mode. The user interface unit 205 display may include various displays according to the design. For example, in step S101, if the display is not a job status display mode (NO in step S101), a determination is made in step S106 as to whether the display is a menu mode. If the display is a menu mode (YES in step S106), the routine advances to step S107 and the user interface unit 205 displays the menus as shown in FIG. 6. Conversely, if the display is not a menu mode (NO in step S106), the routine advances to step S108 and the user interface unit 205 successively determines if the display is another mode.

The following is an explanation of processing when the current mode is determined to be the job status display mode in step S101 (YES in step S101). In the present mode, the user interface unit 205 displays the job status information. Here, the control of displaying the job status information for each job data item on the user interface unit 205 is conducted. The job status information is configured so as to be updated successively to the most recent information. First, in step S102, the user interface unit 205 updates the job data to be displayed. The user interface unit 205 conducts processing to add newly added job data to the display and to erase from the display unnecessary jobs in which the output is completed. This processing is all associated with job IDs.

In step S103, the user interface unit 205 obtains the most recent information of the job status information corresponding to the job ID and then updates tables for displays. In step S104, the user interface unit 205 displays the tables for displays on the user interface unit 205. The routine returns to step S101 after a waiting time of, for example, several milliseconds as necessary in step S105.

Figure 11:
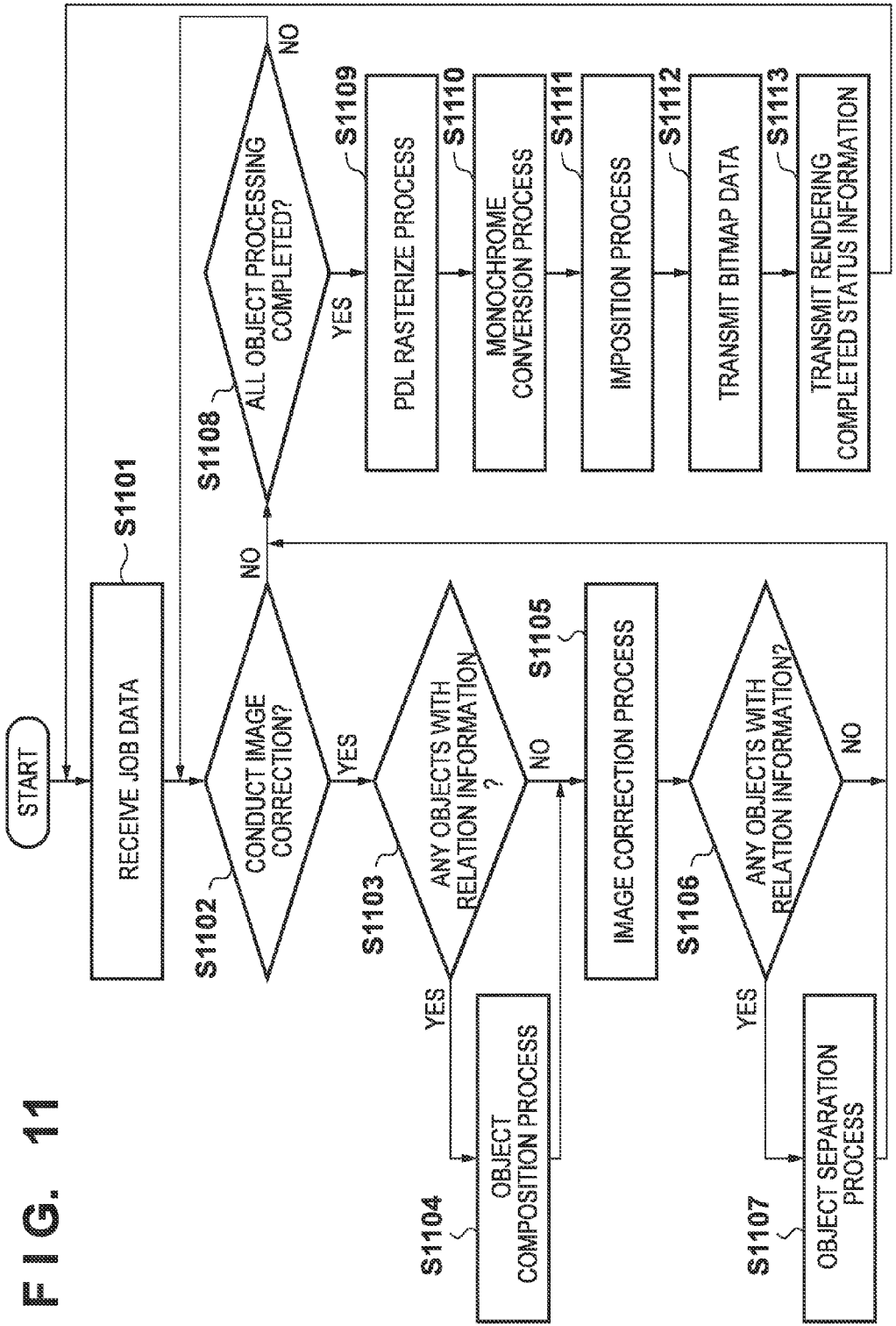
FIG. 11 is a flow chart of a process by a rendering unit.

Next, the processing by the rendering unit 204 will be described with reference to FIG. 11.

In step S1101, the communication unit 212 in the rendering unit 204 receives the commands, the parameters (there is a case where object relation information is added), and the divided job data transmitted from the control unit 203. Next in step S1102, the rendering unit 204 determines whether it is necessary to conduct the image correction process of the divided job data according to the commands. If it is not necessary to conduct the image correction process (NO in step S1102), the routine advances to step S1108. Conversely, if it is necessary to conduct the image correction process (YES in step S1102), the routine advances to step S1103.

In step S1103, the rendering unit 204 determines whether related objects exist on the basis of the received parameters (if object relation information is added). If related objects exist (YES in step S1103), the routine advances to step S1104 and the object composition unit 214 in the rendering unit 204 conducts an object composition process to combine the objects on the basis of the object relation information. Conversely, if related objects do not exist (NO in step S1103), the objects are used as-is. In step S1105, the rendering unit 204 conducts the image correction process according to the commands.

In step S1106, the rendering unit 204 determines whether related objects exist on the basis of the received parameters (if object relation information is added). If related objects do not exist (NO in step S1106), the routine advances to step S1108. Conversely, if related objects do exist (YES in step S1106), that is, if objects are combined, the routine advances to step S1107. In step S1107, the object separation unit 215 in the rendering unit 204 conducts the object separation process to separate the combined objects to the objects before the combining in order to return the combined objects to the original objects.

In step S1108, a determination is made as to whether the processing of the abovementioned operations is completed for all the objects included in the job data. If the processing for all the objects is not completed (NO in step S1108), the steps S1102 to S1108 are repeated until no objects subject to processing remain. After the data required for PDL rasterizing is gathered, that is, if the processing for all the objects is completed (YES in step S1108), the rendering unit 204 conducts the PDL rasterize process in step S1109.

In step S1110, the rendering unit 204 conducts the monochrome conversion process on the generated bitmap data. In step S1111, the rendering unit 204 conducts the imposition process according to the commands and generates bitmap data for outputting. In step S1112, the rendering unit 204 transmits the generated bitmap data for outputting to the control unit 203 through the communication unit 212. In step S1113, the rendering unit 204 transmits, to the control unit 203, rendering completed status information that indicates whether the results of the processing by the rendering unit 204 were successful.

Figure 12:
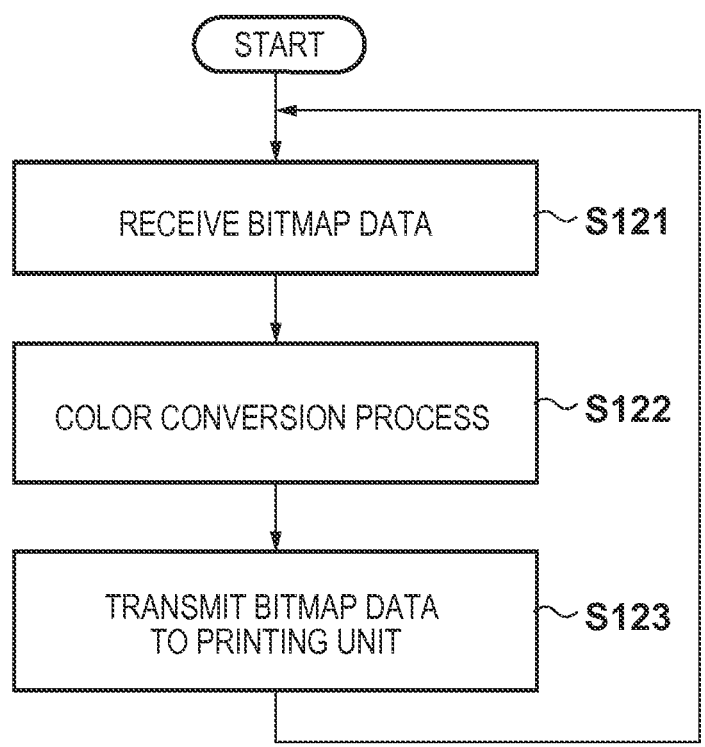
FIG. 12 is a flow chart of a process by a printer engine unit.

Next, processing by the printer engine unit 206 (706) will be explained with reference to FIG. 12.

First in step S121, the printer engine unit 206 receives the bitmap data from the control unit 203. In step S122, the printer engine unit 206 conducts a color conversion process on the received bitmap data on the basis of the contents of the header information of the bitmap data. The header information contains information such as whether the data is in the monochrome mode or the color mode and the like. The color conversion process uses, for example, different color conversion tables depending on whether the mode is the color mode or the monochrome mode. After such processing, colors are converted to color spaces such as CMYK and the like handled by the printer engine unit 206, and a binarize process is conducted as necessary. Next in step S123, the printer engine unit 206 transmits the bitmap data after the color conversion processing to a printing unit. As a result, the bitmap data after the color conversion process is printed on the print media by the printing unit.

As described above, according to the present embodiment, a determination is made as to which rendering unit to use among the plurality of rendering units in consideration of the layout and the existence of objects in the used PDL that straddle more than one page, and in consideration of the operating statuses of the rendering units.

Moreover, by adding relation information of the objects that straddle more than one page in the used PDL, and by combining the objects and conducting an image correction process in the rendering units, the ability to perform parallel operations without loss of image quality can be improved.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2011-243976, filed Nov. 7, 2011 and 2012-179628, filed Aug. 13, 2012, which are hereby incorporated by reference herein in their entirety.

What is claimed is:

1. A printing apparatus that prints printing data including an image, the apparatus comprising:
   a reception unit configured to receive the printing data;
   a division unit configured to divide the printing data received by the reception unit into page units, generate a plurality of divided printing data and add object relation information indicating a relationship among a plurality of objects in the plurality of divided printing data;
   a plurality of rendering units configured to receive printing unit data and conduct an image correction process and a bitmap data conversion process;
   a rendering management unit configured to analyze the printing data and, on the basis of the analysis result, generate, from the plurality of divided printing data, the printing unit data constituted by the divided printing data to be merged and processed, determine at least one rendering unit to cause the printing unit data to be processed from the plurality of rendering units in accordance with load conditions of the plurality of rendering units, and transmit the printing unit data to the determined rendering unit;
   a spool unit configured to receive and spool bitmap data from each of the plurality of rendering units;
   a printer engine unit configured to print an image based on the bitmap data onto a print medium; and
   a control unit configured to transmit the bitmap data spooled in the spool unit to the printer engine unit in an order to be printed,
   wherein each of the plurality of rendering units comprises:
   a composition unit configured to generate combined printing data by combining the plurality of divided printing data that includes an object indicated by the object relation information and execute the image correction process on the combined printing data; and
   a separation unit configured to separate the combined printing data after executing the image correction process, into a plurality of divided printing data and execute the bitmap data conversion process on the plurality of divided printing data.

2. The printing apparatus according to claim 1, further comprising:
   a user interface unit configured to conduct settings related to the printing data, wherein the division unit generates the divided printing data on the basis of layout setting information specified by the user interface unit or specified in the printing data.

3. The printing apparatus according to claim 1, wherein when two or more rendering units are determined as rendering units for causing the printing unit data to be processed in accordance with the load conditions of the plurality of rendering units, the rendering management unit generates a copy of the divided printing data that constitutes the printing unit data and transmits the copy to one of the two or more determined rendering units, even when a plurality of divided printing data including an object formed so as to straddle more than one page is present in the plurality of divided printing data.

4. The printing apparatus according to claim 1, wherein the object relation information indicates a relationship among objects straddling more than one page.

5. A printing apparatus that prints printing data including an image, the apparatus comprising:
   a reception unit configured to receive the printing data;
   a division unit configured to divide the printing data received by the reception unit into page units, generate a plurality of divided printing data and add object relation information indicating relationship among a plurality of objects in the plurality of divided printing data;
   a management unit configured to analyze the printing data and merge divided printing data related to the same double spread page among the plurality of divided printing data; and
   a plurality of rendering units configured to receive the divided printing data and convert the same to bitmap data,
   wherein each of the plurality of rendering units comprises:
   a composition unit configured to generate combined printing data by combining the plurality of divided printing data that includes an object indicated by the object relation information and execute the image correction process on the combined printing data; and
   a separation unit configured to separate the combined printing data after executing the image correction process, into a plurality of divided printing data and execute the bitmap data conversion process on the plurality of divided printing data.

6. A control method for a printing apparatus that prints printing data including an image, the method comprising:
   a receiving step in which a reception unit receives printing data;
   a dividing step in which a division unit divides the printing data received in the receiving step into page units, generates a plurality of divided printing data and adds object relation information indicating relationship among a plurality of objects in the plurality of divided printing data;
   a rendering management step in which a rendering management unit analyzes the printing data and, on the basis of an analysis result, generates, from the plurality of divided printing data, printing unit data constituted by the divided printing data to be merged and processed, and determines, in accordance with load conditions of a plurality of rendering units, at least one rendering unit to cause the printing unit data to be processed from a plurality of rendering units that receive printing unit data and conduct an image correction process and a bitmap data conversion process, and transmits the printing unit data to the determined rendering unit; and
   a transmitting step in which a control unit transmits bitmap data spooled in a spool unit that receives and spools the bitmap data from each of the plurality of rendering units, to a printer engine unit that prints an image based on the bitmap data onto a print medium in an order to be printed,
   wherein each of the plurality of rendering units performs:
   a composition step of generating combined printing data by combining the plurality of divided printing data that includes an object indicated by the object relation information and executing the image correction process on the combined printing data; and a separation step of separating the combined printing data after executing the image correction process, into a plurality of divided printing data and executing the bitmap data conversion process on the plurality of divided printing data.

7. A control method for a printing apparatus that prints printing data including an image, the method comprising:

a receiving step in which a reception unit receives printing data;

a dividing step in which a division unit divides the printing data received in the receiving step into page units, generates a plurality of divided printing data and adds object relation information indicating relationship among a plurality of objects in the plurality of divided printing data;

a management step in which a management unit analyzes the printing data and merges divided printing data related to the same double spread page among the plurality of divided printing data;

a rendering step in which a rendering unit receives the divided printing data and converts, to bitmap data, each divided printing data merged in the management step by a plurality of rendering units, wherein each of the plurality of rendering units performs:

a composition step of generating combined printing data by combining the plurality of divided printing data that includes an object indicated by the object relation information and executing the image correction process on the combined printing data; and a separation step of separating the combined printing data after executing the image correction process, into a plurality of divided printing data and executing the bitmap data conversion process on the plurality of divided printing data.

* * * * *